United States Patent
Menon et al.

(10) Patent No.: US 10,917,797 B2
(45) Date of Patent: Feb. 9, 2021

(54) METHOD AND SYSTEM FOR DETECTING AND RESOLVING ANOMALIES IN A WIRELESS NETWORK

(71) Applicant: Spectrum Effect Inc., Kirkland, WA (US)

(72) Inventors: Rekha Menon, Kirkland, WA (US); David James Ryan, Jackson, WY (US)

(73) Assignee: Spectrum Effect Inc., Kirkland, WA (US)

( * ) Notice: Subject to any disclaimer, the term of this patent is extended or adjusted under 35 U.S.C. 154(b) by 0 days.

(21) Appl. No.: 15/999,155

(22) Filed: Aug. 17, 2018

(65) Prior Publication Data

US 2020/0059800 A1   Feb. 20, 2020

(51) Int. Cl.
| | |
|---|---|
| *H04W 24/02* | (2009.01) |
| *H04W 24/08* | (2009.01) |
| *H04L 12/26* | (2006.01) |
| *H04B 17/345* | (2015.01) |
| *H04W 24/10* | (2009.01) |

(52) U.S. Cl.
CPC .......... *H04W 24/02* (2013.01); *H04B 17/345* (2015.01); *H04L 43/0811* (2013.01); *H04L 43/16* (2013.01); *H04W 24/08* (2013.01); *H04W 24/10* (2013.01)

(58) Field of Classification Search
CPC ..... H04W 24/02; H04W 24/08; H04W 24/10; H04W 16/14; H04W 16/18; H04W 4/029; H04W 52/244; H04W 52/225; H04W 88/008; H04L 43/0811; H04L 43/16; H04B 17/345; H04B 17/309; H04B 17/23; H04B 17/27; H04B 17/26; G01S 5/0252

See application file for complete search history.

(56) References Cited

U.S. PATENT DOCUMENTS

| | | | |
|---|---|---|---|
| 10,390,180 B1* | 8/2019 | Li | H04W 64/00 |
| 10,419,470 B1* | 9/2019 | Segev | H04L 63/145 |
| 2004/0092281 A1* | 5/2004 | Burchfiel | H04B 7/0408 455/522 |
| 2009/0163238 A1* | 6/2009 | Rao | H04W 52/225 455/522 |
| 2013/0090126 A1* | 4/2013 | Xing | H04B 7/0617 455/452.1 |
| 2014/0253361 A1* | 9/2014 | Rezk | G01S 7/021 342/16 |
| 2014/0358835 A1* | 12/2014 | Marti | G06N 5/02 706/46 |
| 2015/0094087 A1* | 4/2015 | Chen | G01S 5/0252 455/456.1 |
| 2016/0286425 A1* | 9/2016 | Gormley | H04W 28/021 |
| 2018/0220314 A1* | 8/2018 | Chen | H04W 24/04 |

* cited by examiner

*Primary Examiner* — Ricky Q Ngo
*Assistant Examiner* — Michael K Phillips

(57) ABSTRACT

Anomalies at nodes of a wireless network can be detected by receiving performance measurement (PM) data for a plurality of nodes in the wireless telecommunications network, accessing sets of binned data of the PM data for each node of the plurality of nodes, comparing at least one characteristic of the binned data for each node to at least one of a threshold value and the binned data for another node of the plurality of nodes, and determining whether an anomaly is present at each of the plurality of nodes based on a result of the comparison.

18 Claims, 11 Drawing Sheets

METHOD AND SYSTEM FOR DETECTING AND RESOLVING ANOMALIES IN A WIRELESS NETWORK

BACKGROUND

The wide adoption of mobile devices along with ubiquitous cellular data coverage has resulted in an explosive growth of mobile applications that expect always-accessible wireless networking. This growth has placed demands on network performance including demands for fast and reliable communication paths, which causes increasing strain on the limited radio-frequency (RF) spectrum allocated to wireless telecommunication. Accordingly, efficient use of the limited spectrum is increasingly important to the advancement of wireless communication technology.

Interference is a barrier to efficient use of wireless spectrum. Modern wireless communications operate in interference limited environments where signal quality to and from network subscriber devices is limited in part by interference from other users served by the same or nearby cells. The design and optimization of these networks are based on having clear spectrum occupied only by radio frequency transmitting equipment associated with the specific network. However, this ideal of clear spectrum occupied only by intended users of the system is not always achieved.

Real world systems often experience unexpected network interference which may originate from intentional and or unintentional radio frequency (RF) generating sources. These potential interference sources include many things such as industrial machinery, electronics test equipment radiating signals in the bands of interest, undesired mixing products generated by the licensed system itself and illegal radio sources. The result of these system interference sources is degraded system service and reduced wireless network capacity and coverage as the intentional system signals suffer capacity and quality losses due to these interferers.

Conventional approaches for detecting and subsequently locating these network interferers typically involve intentionally disabling transmitting equipment across large areas of the network coverage area and searching for interference sources using sensitive receiving equipment and directional antennas. These methods are very costly as they involve turning off the revenue-generating network equipment and deploying teams in the field, typically during maintenance windows, which are low network utilization times such as the middle of the night. If network interferers are only present outside of these search times, then they will not be detected or located as part of these searches.

Another approach to interference detection involves deployment & utilization of dedicated energy measurement probes throughout the serving areas. Energy detection probes in this context are radio receiving devices that quantify energy levels detected within defined radio frequency bands, as opposed to data level probes that detect information in RF transmissions. However, there are substantial costs associated with installing, maintaining and monitoring probes, and a large number of probes would be required to effectively cover network areas.

Anomalous and non-cellular interference is often detected indirectly through its effects on a network. Similarly, other problems that affect a wireless network are detected indirectly by their effects on network performance. For example, a malfunctioning antenna of a base station may be detected by its effects on performance metrics such as handover failures and dropped calls.

Periodic measurements of the performance of an RF environment as well as factors that influence the RF environment, such as node transmission parameters, are made by different nodes in a wireless communication network. These measurements can be used to identify nodes with anomalous behavior is caused by a problem such as interference or a malfunctioning or misconfigured base station. Performance measurements are one of the primary tools available for identifying and solving problems in a wireless network.

Wireless networks measure and collect a staggering amount of performance data. For example, a single base station may support dozens of cells, and measure performance information for each cell at a high sampling rate. Because the amount of performance data collected in a cellular network is so large, it is impractical to communicate that data in its raw form.

To reduce bandwidth requirements for reporting measurements, instead of making a sequence of measurements available from the network equipment, a histogram of measurements over an observation interval may be compiled and made available. While binning data may help reduce the total amount of performance data for anomaly detection, techniques that are effective for detecting anomalies using discrete data points are not effective for analyzing data presented in histograms.

TECHNICAL FIELD

Embodiments of the present disclosure relate to detecting anomalous events in a wireless communication network.

BRIEF SUMMARY

This disclosure describes techniques to measure, collect and analyze performance data in a wireless telecommunication system to detect anomalous behavior. The techniques described in this document have been applied to wireless networks, and the inventors have found that the techniques are much more effective to detect some types of anomalous behavior than conventional techniques.

In an embodiment, a method for a wireless telecommunications network includes receiving performance measurement (PM) data for a plurality of nodes in the wireless telecommunications network, accessing sets of binned data of the PM data for each node of the plurality of nodes, comparing at least one characteristic of the binned data for each node to at least one of a threshold value and the binned data for another node of the plurality of nodes, and determining whether an anomaly is present at each of the plurality of nodes based on a result of the comparison. The PM data may be received from a Radio Access Network (RAN) as at least one histogram or discrete measurements, and the method may further include converting the at least one histogram or the discrete measurements into at least one probability density function (PDF), wherein the binned data that is compared are PDFs.

In an embodiment, comparing the at least one characteristic includes comparing a spread of each set of binned data to the threshold value, and an anomaly is determined to be present at a respective node associated with each set of binned data that exceeds the threshold value. Comparing the at least one characteristic may include comparing a distance between a first set of binned data for each node and a second set of binned data for each node to a predetermined value, wherein the first set of binned data and the second set of binned data are for consecutive measurement intervals.

Comparing the at least one characteristic can include determining distances between each set of binned data of the plurality of nodes and every remaining sets of binned data of the plurality of nodes and grouping the sets of binned data into clusters based on the distances. In addition, determining whether an anomaly is present can include comparing a number of sets of binned data in each cluster to a threshold value, wherein anomalies are determined to be present at each cluster for which the number of PDFs sets of binned data is less than the threshold value.

Comparing the at least one characteristic of the binned data for each node to at least one of a threshold value and the binned data for another node of the plurality of nodes can include comparing a spread of each set of binned data to a first threshold value, comparing a distance between consecutive sets of binned data of each node to a second threshold value, and comparing shapes and positions of sets of binned data for a same time interval to each other.

The PM data may be created by measuring physical properties of the plurality of network nodes. A cause of a detected anomaly may be identified by analyzing characteristics of the node, and embodiments can include resolving the cause of the anomaly.

In addition, comparing at least one characteristic of the binned data for each node to at least one of a threshold value and the binned data for another node of the plurality of nodes can include determining distance values between a first node of the plurality of nodes and other nodes of the plurality of nodes, comparing the distance values to a predetermined threshold value, and when all of the distance values exceed the predetermined threshold value, identifying the first node as an anomalous node.

Embodiments of the present disclosure may be implemented as a non-transitory computer readable medium with computer-executable instructions stored thereon which, when executed by a processor, performs one or more of the steps described above.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
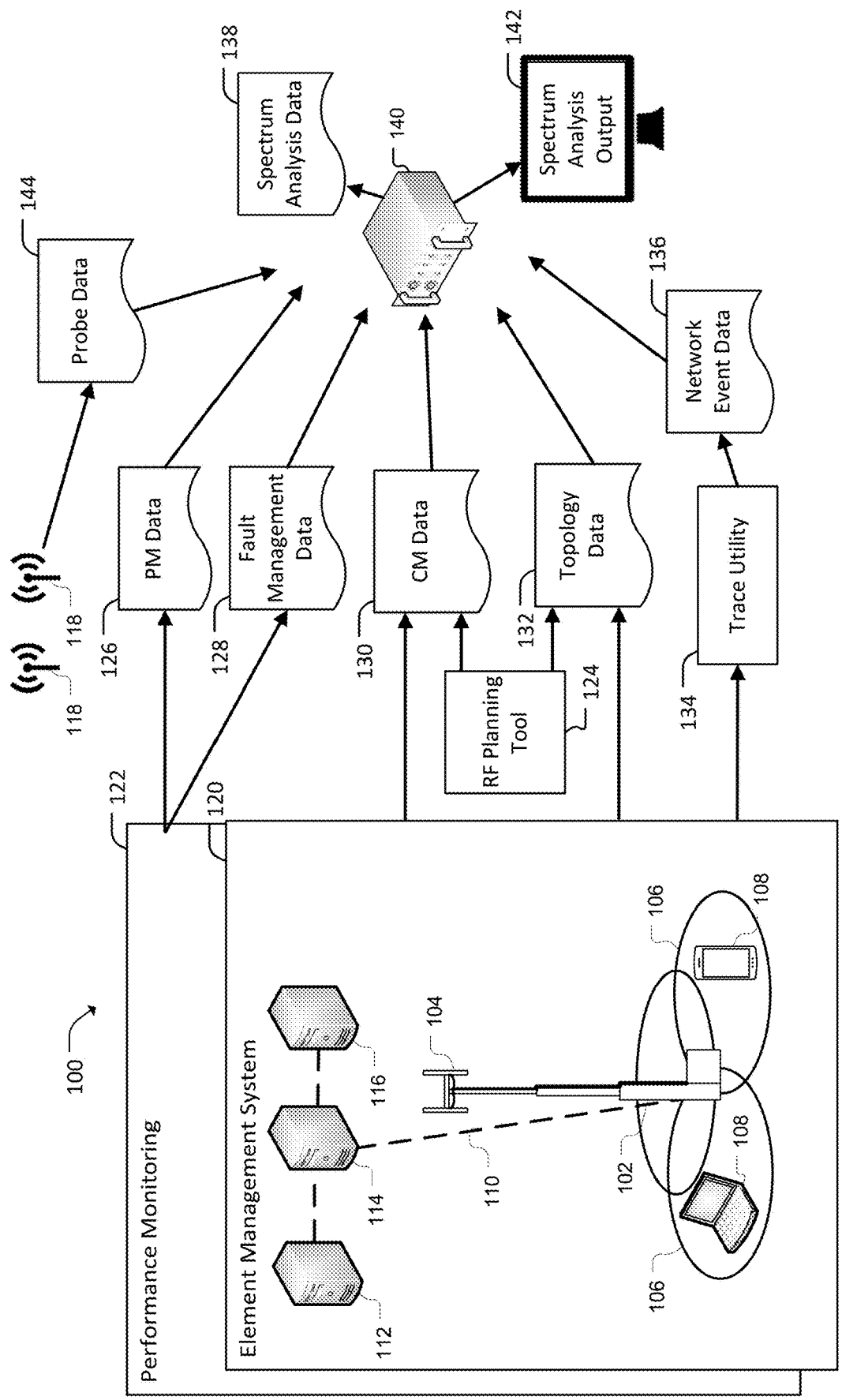
FIG. 1 illustrates a system for identifying interference in a cellular communications network according to an embodiment.

FIG. 1 illustrates a networked spectrum analysis system 100 according to an embodiment. The system 100 integrates information from available wireless network sources to detect, isolate, characterize and locate undesired radio frequency interference in the context of a wireless network. Sources of this information, which are hardware elements of a wireless network, are available in typical wireless cellular networks, but they are not conventionally connected and configured in the manner suggested by this disclosure. In particular, the spectrum analytics server 140 is a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, NR, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the communications network 100 are part of an Element Management System (EMS) 120 and a Performance Monitoring (PM) system 122. The PM system 122 may include base stations 106 as well as core network equipment that collect and process performance data and performance metrics for the network. A spectrum analysis server 140 interfaces with various network components, including components of the PM system 122 and the EMS 120.

Although FIG. 1 shows the spectrum analysis server as a single, discrete component, embodiments are not so limited. For example, in other embodiments, components of the spectrum analysis server 140 may be distributed among multiple computing entities. In addition, hardware for the spectrum analysis server may perform processes not directly related to interference.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, etc.). PM data 126 may include raw or aggregated performance data.

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analytics server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to spectrum analysis server 140. Fault Management Data 128 includes, for example, alarm data that indicates performance issues at one or more cell site.

Configuration Management (CM) data 130 is input to the spectrum analysis server 140 from EMS 120. CM data 130 includes the current configuration of various wireless network equipment, such as the configuration of base stations 102 and core components such as Radio Network Controllers.

CM Data 130 is quasi-static and typically only updated as a result of network optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and Topology data 132. Alternative embodiments may include a direct data connection between entities that perform RF planning functions and the spectrum analysis server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is reported at intervals of a few seconds, it can be used to determine variance of conditions over time at relatively short intervals, such as five minutes, one minute, 30 seconds, or as low as the reporting interval, which may be less than one second.

Network event data 136 includes call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies and may vary in vendor-specific implementations. For instance, network event data 136 is typically collected at the RNC entity in 3GPP defined 3G networks (i.e., UMTS, HSPA), but network event data 136 is collected by the eNodeB entity in 4G LTE systems. Network event recordings may be pulled directly from the network elements that store the events by the spectrum analysis server 140, or automatically stored on a separate data storage server, or staging server, such that external systems such as the spectrum analytics server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136. In such an embodiment, spectrum analysis does not use input from a dedicated Performance Monitoring system 122, but may derive base station performance indicators directly from network event data 136. In such an embodiment, network event data records may be aggregated.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

Also shown in FIG. 1 is a plurality of energy sensing probes 118, which may be dedicated to the task of sensing energy in particular frequencies and reporting energy detection results. Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the spectrum analytics server 140. Subsequently, the measurements from dedicated energy detection probes 118 may be correlated with known probe positions and probe configuration characteristics (e.g. directional antennas) as well as current network loading data to enhance the detection of undesired radio frequency interference within the network.

Probe data may in some cases be broadband and cover wider spectrum segments than the operational wireless network, and as such may be used to monitor bands adjacent to or even highly separated from current wireless bands. Such broadband spectrum analytics sensing may be used to support frequency agile spectrum sharing solutions whereby internal band metrics, e.g. network event data correlated with topology and CM data, as well as probe supported broad band metrics, to enhance performance of spectrum analytics.

The spectrum analysis server 140 represents a specific processing device that interfaces with one or more of the external data sources described above. The spectrum analysis server 140 may perform one or more of anomaly and interference detection, analysis, comparison, characterization and localization processes described in this disclosure. In an embodiment, the spectrum analysis server 140 is physically located in an operator's Network Operations Center (NOC). From a logical perspective, the spectrum analysis server 140 is located in the Operations Support System (OSS) plane. The spectrum analysis server 140 may perform one or more of the specific processing steps described below.

Figure 2:
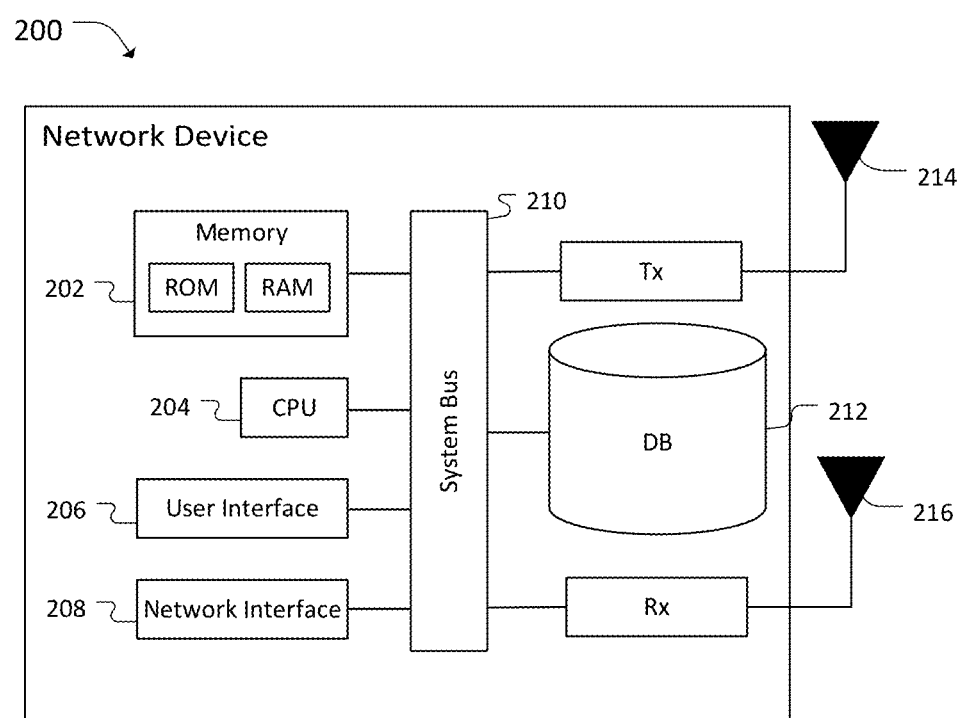
FIG. 2 illustrates a network device according to an embodiment.

FIG. 2 illustrates a block diagram of a network device 200 that may represent UE 108, network controller devices 110, 112 and 114, a spectrum analysis server 140, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device 200 has wireless connectivity, it may have a transmitter 214 and a receiver 216, each of which may include one or more antennas that operate on one or more frequencies.

Wireless network nodes in telecommunication networks make periodic measurements of interference. The interference measurements can be used to adapt network parameters to optimize performance in the presence of interference. However, it is important to characterize the interference in order to implement appropriate optimization processes.

Causes of highly localized non-network interference include sparking transformers and industrial machinery. In addition to localized non-network interference, cells experience interference from transmissions within the network itself.

Processes used to handle localized non-network interference are different from processes used to handle interference from within the network. Non-network interference is typically handled by locating and eliminating the interference source. For example, interference from a sparking transformer can be mitigated by replacing the transformer. Network interference can be handled in a number of ways, including adjusting network parameters such as power, frequency, antenna azimuth and beamwidth, and changing how transmissions are scheduled. In order to implement the most effective processes for handling interference, it is important for networks to accurately detect and characterize the interference.

Anomalous behavior in a wireless network is generally identified by comparing measured values with values that are typical of the measurements and flagging values that have large deviations from the typical behavior. However, comparing sets of values with each other requires different techniques than techniques that are used for comparing single values. In addition, due to the inherent instantaneous variability of the wireless environment, it may be more effective to compare statistics of measurements over the observation period rather than the sequence of observations over the observation interval.

Figure 3:
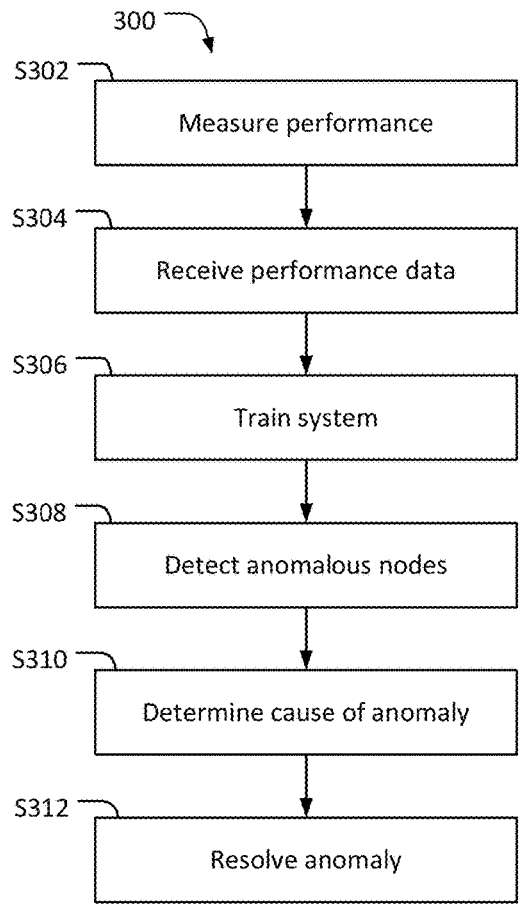
FIG. 3 illustrates an embodiment of a process for improving network performance using anomalous node detection.

FIG. 3 illustrates an embodiment of a process 300 for improving network performance using anomalous node detection. Process 300 may begin with measuring performance characteristics at S302. Examples of network performance that may be measured at S302 include uplink and downlink interference levels, uplink and downlink power levels and transmission power levels.

Interference may be measured by measuring RF energy that is present in one or more channel that is used for wireless cellular telecommunications. Interference may be measured by measuring RF energy levels at a network node such as a base station 102, UE 108, or a probe 118. Transmission events may be measured by one or more entity that causes the traffic, such as a base station 102 or UE 108, an entity that schedules transmissions, or one or one of the core elements 112, 114 and 116 of the element management system 120.

The performance data may be data related to uplink or downlink energy. In more detail, network elements such as RNCs and eNodeBs may conduct uplink energy measurements at a periodic interval, such as every one or two seconds. The energy measurements may be referred to as received wideband power or uplink Received Signal Strength Information (RSSI). Measurements of uplink energy may be in units that map to dBm of power on a range of approximately −120 dBm to −58 dBm.

The network measurements are received by a system at S304. In an embodiment, the network measurements are received by a spectrum analysis server 140, which may perform additional steps of analyzing the data and detecting anomalous nodes. Accordingly, the spectrum analysis server 140 may store the performance data and access the stored data when training or performing analysis.

The network performance characteristics that were measured at S302 are received by a spectrum analysis server 140 at S304. Performance data may be reported by a Radio Access Network (RAN) as PM data 126. PM data 126 is often in the form of histograms in which measurements are aggregated over some time interval such as 15 minutes. In some embodiments, PM data 126 may be provided as a probability density function (PDF) for which probabilities are normalized to a probability of 1 by a normalizing constant. Some vendors also create and report KPIs (Key Performance Indicators) constructed from the PM Data 126. KPIs are typically reported at 15-minute intervals.

Although embodiments of the present disclosure are described using the term "PDF," persons of skill in the art will recognize that elements of the disclosure can be achieved using histograms instead of PDFs. Therefore, the use of the term "PDF" in the following disclosure should not necessarily be interpreted as limiting. In addition, the term "binned data" is used to encompass both PDFs and histograms, both of which are arranged according to counts, or bins. Accordingly, as used herein, the term "binned data" means data that is arranged as a histogram or a PDF. A set of binned data refers to a single histogram or PDF, e.g. a set of measurements that were conducted over a certain time interval and arranged into bins according to frequency of occurrence.

KPIs can also be constructed by a spectrum analysis server 140 from PM data 126. In some embodiments, performance data may be received as event data 136. Event data typically has a high resolution and may not be in the form of counters. In such an embodiment, an step of compiling the event data 136 into a histogram and converting the histogram into a PDF may be performed.

Figure 5:
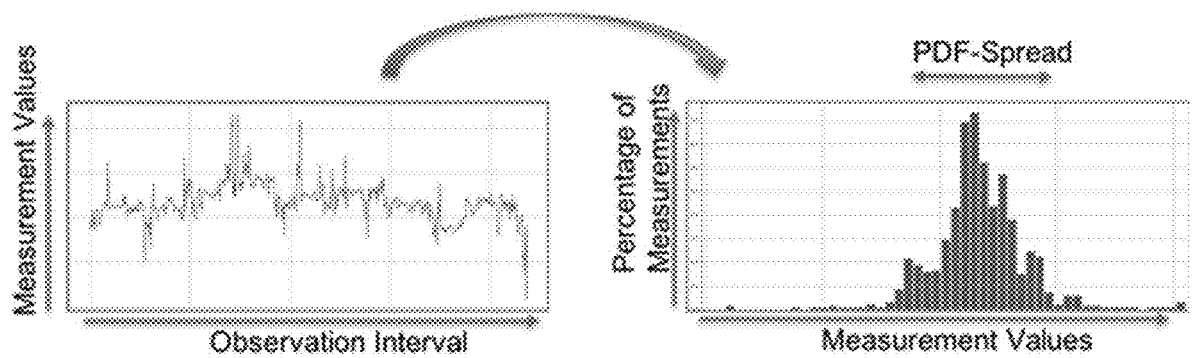
FIG. 5 illustrates an embodiment of converting performance measurements to a probability density function (PDF).

An example of converting measurements is shown in FIG. 5. Raw measurement data measured over an observation interval, such as event data 136, is shown on the left side of the figure. The same data that has been compiled into a PDF is shown on the right side of FIG. 5. In embodiments of the present disclosure, performance data may be received in either form. When performance data is received as raw or high resolution data in the form of discrete data points, it may be converted to histograms or PDFs prior to analysis.

When network events are collected through KPI and PM reporting, examples of specific PM counters and aggregate KPIs include Received Total Wideband Power (RTWP), received interference plus noise power, RSSI measured on downlink by UEs or measured on the uplink at the serving base station, Received Signal Code Power (RSCP) and Reference Signal Received Power (RSRP), which describe energy levels present in a channel, Uplink throughput, Downlink throughput, dropped call rates, and handover statistics. In some embodiments, the PMs and KPIs collected in the service of collecting data for events relate to traffic levels and interference. In some embodiments, PM data 126 may be collected from a PM system 122 or a SON system, which are typically pre-existing in networks.

Figure 4:
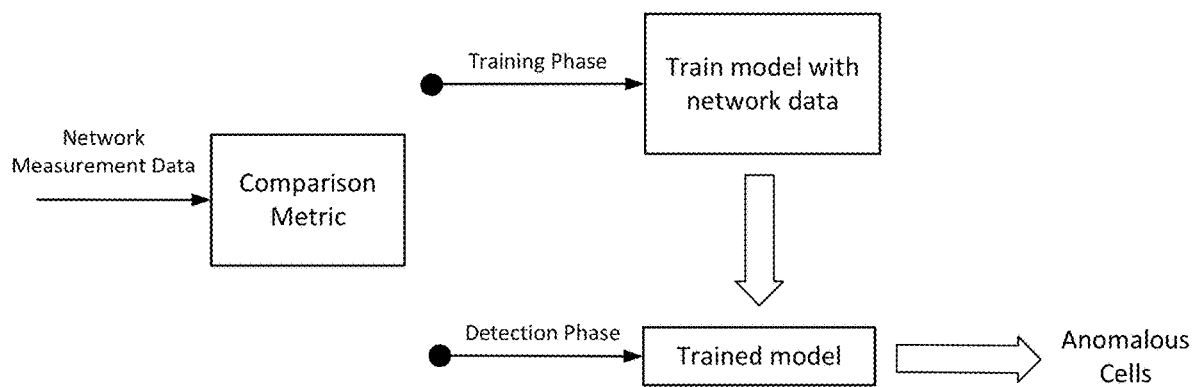
FIG. 4 illustrates an embodiment of training a model to detect anomalous node behavior.

A process for training a system at S306 and using a trained model is illustrated in FIG. 4. In an embodiment, a system receives network measurements, or performance data, as described for S302 and uses that data to calculate a comparison metric. In the first training phase, statistical comparison metrics are calculated for a predefined period of time and over a large set of nodes from the network.

The set of measurement values from the observation intervals may be in the form of a PDF or in the form of individual measurements. A model for typical network behavior is created using these calculated metrics. In various embodiments, a model for typical network behavior may be determined for multiple nodes in a network, including cells, antennas and base stations. Training may be conducted for every node in a network.

Training may be conducted when a node is first activated in a network, or after one or more parameter of a node has been changed, since parameter changes can change behavior of a node. Training may also be conducted on a periodic basis to account for changes in a network environment, e.g. changes in population density or the physical environment of a node, thereby ensuring that the comparison metric is relevant to current conditions of a node.

The comparison metric may have various forms. In an embodiment, the comparison metric is a predetermined range that represents a limit of normal behavior, such that values outside the predetermined range indicate anomalous behavior at the node. When a predetermined range is used, the range may include upper and lower threshold values, such that values outside of that range indicate anomalous behavior. In another embodiment, a single predetermined value may be used. The comparison metric may also have characteristics of a PDF that represents normal behavior of a node and an amount of deviation, or threshold, that defines a range of normal behavior.

The comparison metric resulting from training at S306 is used by a system to detect anomalous cells in a detection phase. For example, when a comparison metric includes a PDF representing normal behavior at a node, anomalous behavior may be determined by comparing the spread, shape, position or distance of measurements from the node to the PDF representing normal behavior, and if the spread, shape, position or distance deviates beyond a predetermined value that is an aspect of the comparison metric, then anomalous behavior is determined to be present at the node. The concepts of spread, shape, position and distance will be explained in more detail below.

In the detection phase shown in FIG. 4, a comparison metric that was calculated for a node is passed through a constructed model to identify observation intervals and associated nodes that deviate sufficiently from typical behavior to be considered anomalous, or indicative of a problem within the network.

Figure 6:
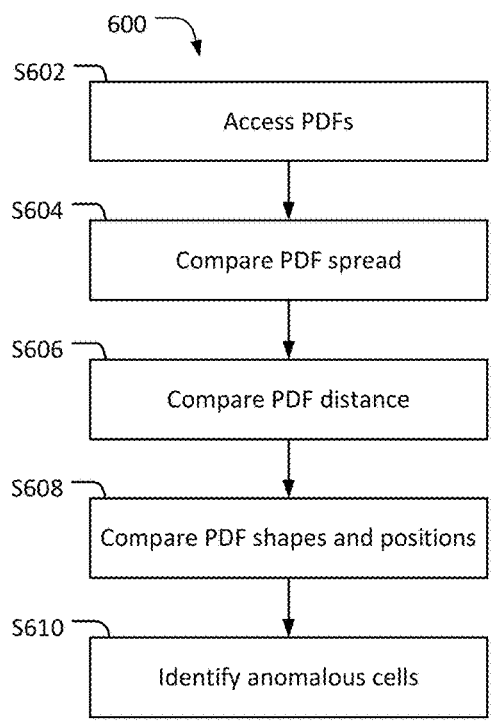
FIG. 6 illustrates an embodiment of a process for detecting anomalous nodes.

Anomalous nodes are detected at S308 by analyzing the performance measurement data received at S304. Detecting anomalous nodes at S308 will now be discussed in detail with respect to a process 600 for detecting anomalous nodes illustrated in FIG. 6.

Performance data that has been arranged into PDFs is accessed at S602. Accessing the PDFs may include accessing PDFs created from performance data that was received at S304.

One technique for detecting anomalous nodes involves comparing a spread of PDFs representing measured performance data at S604. In an embodiment, a PDF spread is one or more value that represents the spread, or dispersion of a PDF. The PDF spread gives a measure of the range of the samples over the measurement interval. In one embodiment, PDF spread is based on the sample standard deviation of the samples in the measurement interval. In various embodiments, the PDF spread may be a statistical measure of dispersion, such as a Mean absolute deviation (MAD), an interquartile range (IQR), etc.

As discussed above, measurements from the observation intervals may be in the form of a PDF or individual measurements. It is possible to determine a PDF spread directly from a sequence of measurements by converting the measurements to a PDF. For example, FIG. 5 shows instantaneous measurements on the left side of the figure that are converted to a PDF with an associated spread on the right side of the figure.

As discussed above with respect to S306, a model for PDF spread may be trained using network data. In one embodiment, this is done by choosing nodes from a large part of the network and calculating PDF spreads for nodes over a large number of observation intervals. In a non-limiting example, a model may be trained using data for 1000 cells over a period of 7 days, which includes 672 15-minute intervals. In other embodiments, training may be conducted using at least 100 over a period of at least three days. In one embodiment, the typical or normal range of PDF spread for each node and performance characteristic can be calculated from the set of PDF spreads to be $\mu \pm 3\sigma$, where $\mu$ is the average value from the set of PDF spreads and $\sigma$ is the standard deviation from the set of PDF spreads.

After a model for PDF spreads is created, PDF spreads are calculated on a continual basis for the nodes in the network that are to be tested and over the observation intervals that they are to be tested in. The model determines nodes and observation intervals for which the PDF spread is outside the typical range to be anomalous.

Figure 7A:
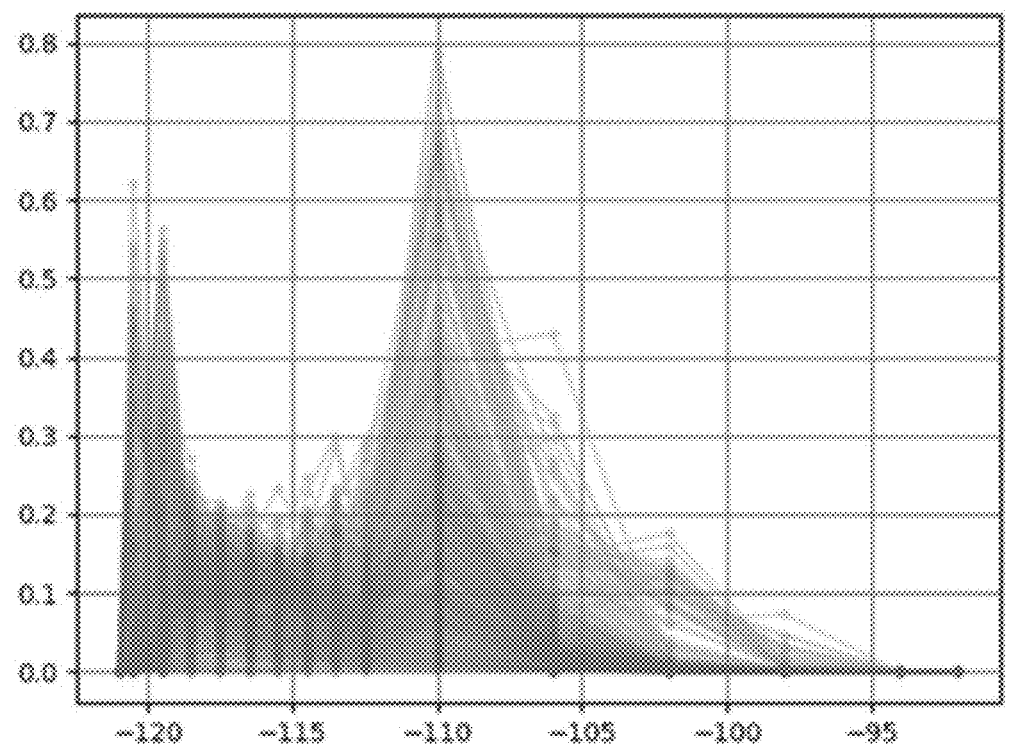
FIGS. 7A and 7B illustrate PDFs for a network node.

An example of detecting anomalies by comparing PDF spreads at S604 will now be explained with respect to FIGS. 7A-8B. FIG. 7A shows a set of about 728 PDFs for a cell in a network. The example in FIG. 7A uses received uplink power level as performance data. The data in FIG. 7A is not simulation data—it was collected by conducting measurements at an active cell in a wireless telecommunications network. The observation interval for each PDF spread is 15 minutes.

Figure 7B:
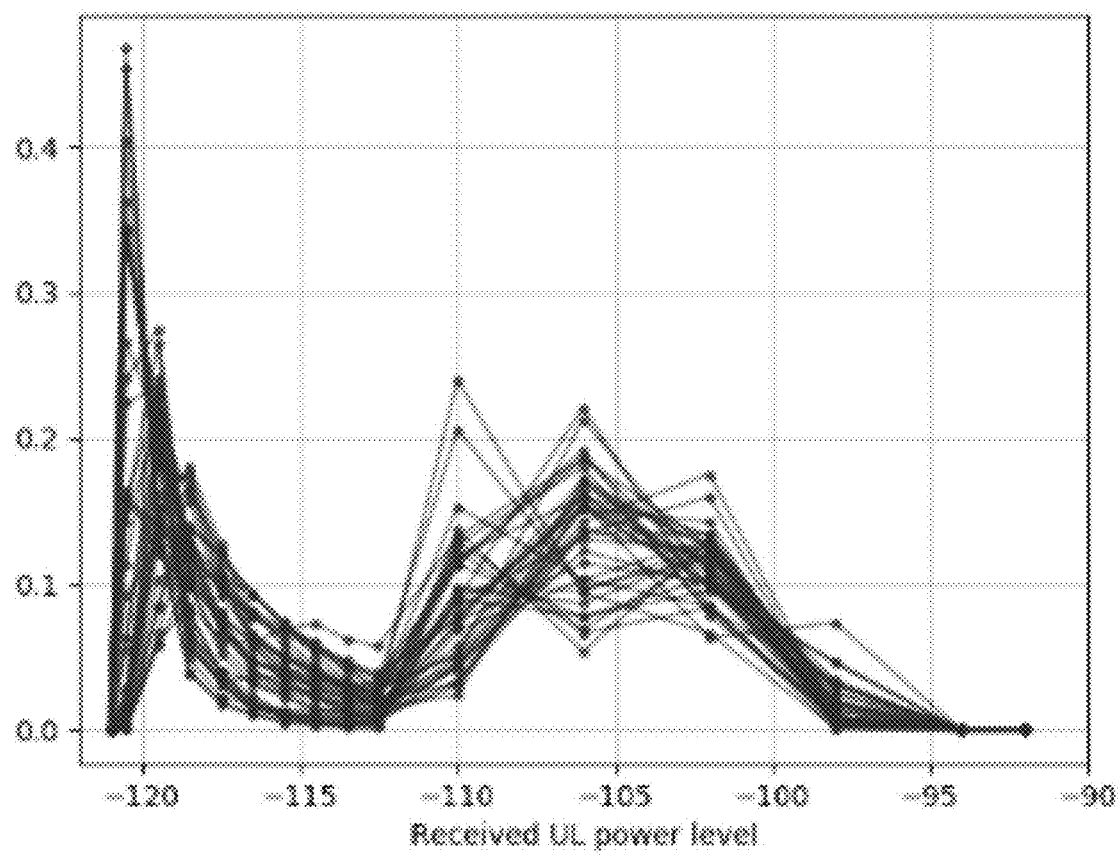

The PDFs in FIG. 7A represent normal behavior at the cell. In contrast, FIG. 7B illustrates a set of about 40 PDFs that represent anomalous behavior at the same cell. Here, the anomalous behavior was caused by an intermittent source of interference that is external to the network, e.g. a power generator.

Figure 8A:
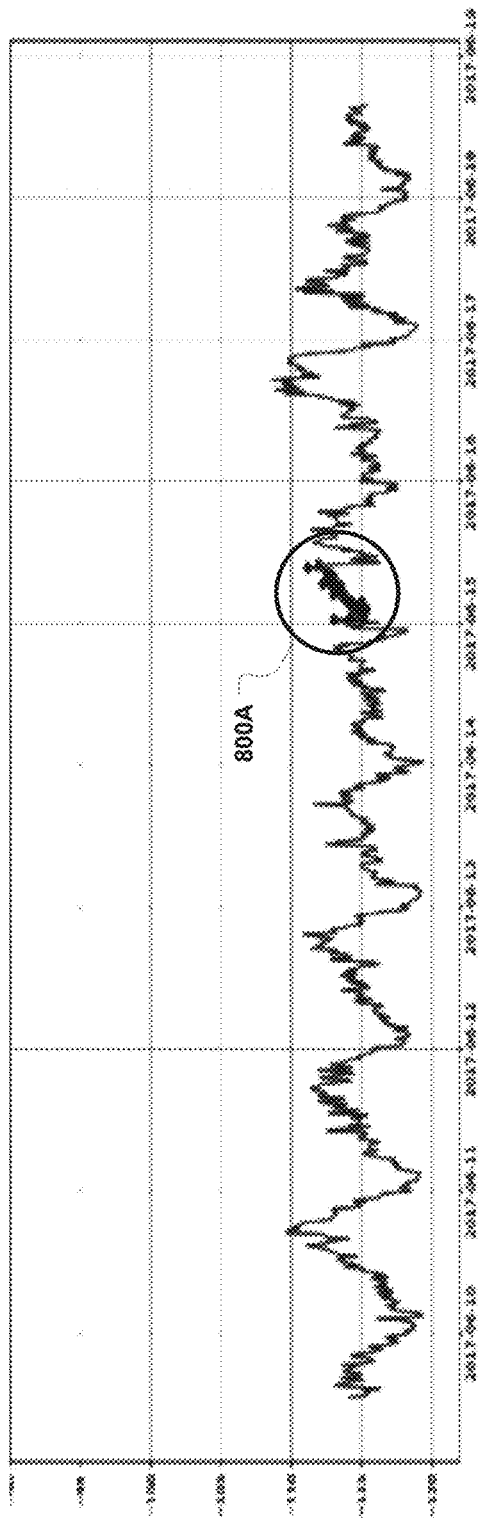
FIGS. 8A and 8B illustrate plots of PDF averages and PDF spreads, respectively, for the same network node and time interval.

The conventional approach to detecting anomalous behavior using PDFs is to calculate an average value for each PDF and conduct a visual or mathematical evaluation of the average PDF values to see if outliers are present. FIG. 8A is a plot of all of the average values of the PDFs shown in FIG. 7A and FIG. 8A. The anomalous PDFs of FIG. 7B are grouped together and indicated as element 800A.

Figure 8B:
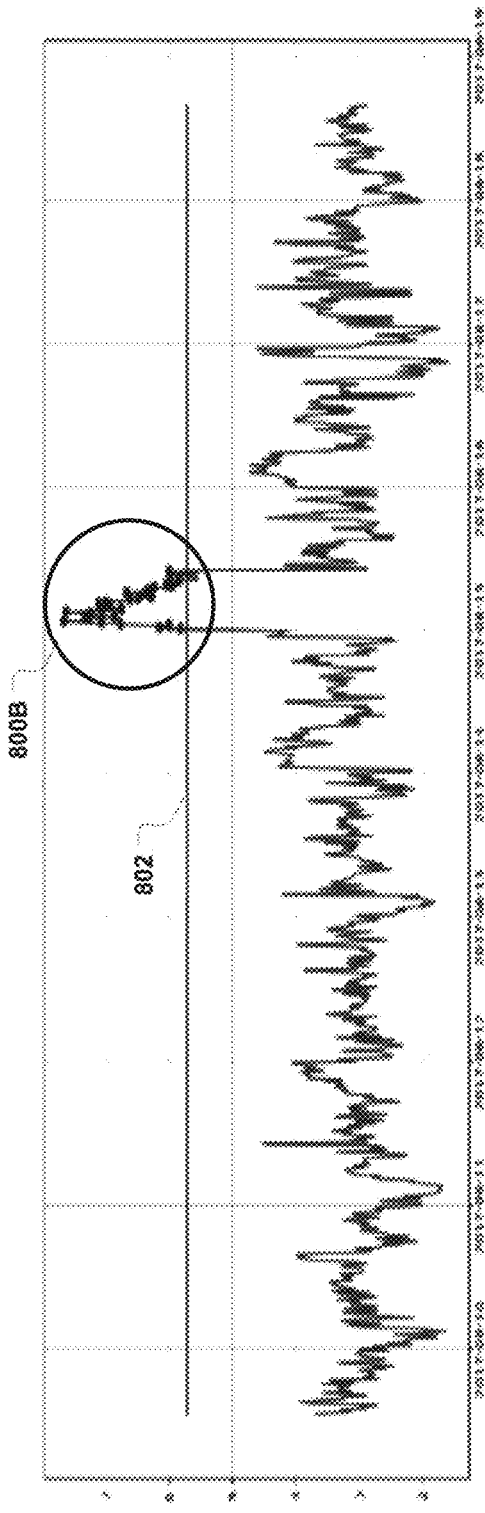

FIG. 8B is a plot of PDF spreads of the PDFs of FIG. 7A and FIG. 7B. In addition, FIG. 8B shows a predetermined threshold value 802 that was created by training the associated node. Any points that exceed predetermined value 802 are considered to be anomalous. In FIG. 8B, the anomalous PDFs shown in FIG. 7B and points 800A in FIG. 8A are shown as a group 800B.

This anomalous behavior cannot be identified from the from the average PDF values that are plotted in FIG. 8A. Thus, this example illustrates that PDF spread can identify anomalous behavior at a network node over an observation interval that cannot be identified using conventional techniques.

PDF spread can be especially useful for detecting anomalies that occur as bursts, e.g. anomalies that last for relatively short durations, such as intermittent external interference. In the conventional approach, averaging the PDFs minimizes the effects of short duration deviations from normal behavior. In contrast, short duration events have a stronger effect on the spread of a PDF.

Another disadvantage of using an average value is that normal activity levels that have opposing magnitude to an anomaly may not be detected. For example, if an interference anomaly is present at a time when interference is low, the high interference anomaly is obscured by averaging with the low interference levels. In contrast, deviation between low interference and intermittent anomalous interference has a relatively strong effect on a PDF spread and is much easier to detect using PDF spread instead of averages.

In an embodiment, anomalous nodes are detected by evaluating distance between sequential PDFs at S606. PDF distance can be characterized as a measure of similarity between PDFs. Some examples of PDF distance metrics that can be used are Hellinger distance, Kullback-leibler distance, Jensen-Shannon distance, Bhattacharya distance and Histogram intersection.

A model may be constructed to determine typical values of the PDF distance between successive measurements at a node in the network by training the system at S306. In one embodiment, this is done by choosing nodes from a large region of the network and calculating the PDF distance over successive measurements at these nodes over a period of multiple days. The typical range for this set of PDF distance metrics is then determined. In an embodiment, the typical range is determined to be $\mu \pm 3\sigma$ where $\mu$ is the average value from the set of calculated metrics and $\sigma$ is the standard deviation from the set of calculated metrics. The PDF distance metric for each node may be specific to that particular node, or may be shared with other similar nodes.

Typical traffic behavior in cellular networks varies gradually across typical reporting time-scales in cellular networks, e.g. 15 minutes. Hence the PDFs of measurements from successive reporting intervals are similar under normal conditions. Dissimilar behavior may be indicative of unexpected events such as external interference in the network. However, dissimilar behavior is not readily identified by comparing the averages of consecutive PDFs. As discussed above, events such as interference may exhibit short duration or "burst" behavior patterns, which have a greater influence on the shape of PDFs than on their average values. Moreover, comparing PDFs based on PDF distance for consecutive PDFs is especially effective at detecting the onset or termination of events that cause anomalous behavior.

A model for PDF distance may be created at S306 using data for intervals of normal node behavior. After the model is created, PDF distance between successive PDFs are calculated on a continual basis for the nodes in the network that are to be tested and over the observation intervals that they are to be tested in. The model identifies nodes and observation intervals for which PDF distance is outside the typical range to be anomalous when the distance between consecutive PDFs exceeds a predetermined value derived from training the associated node.

An anomaly at a node can be determined whenever the distance between two consecutive PDFs exceeds a threshold value, so it is possible to detect an anomaly at an onset or a termination. When an anomaly is only present for one interval, it is possible to detect the anomaly using PDF distance when the distance threshold is exceeded for a proceeding interval or a subsequent interval. Accordingly, if the anomaly is not identified from one of those intervals, it is possible that the anomaly will be detected for the other interval.

Figure 9:
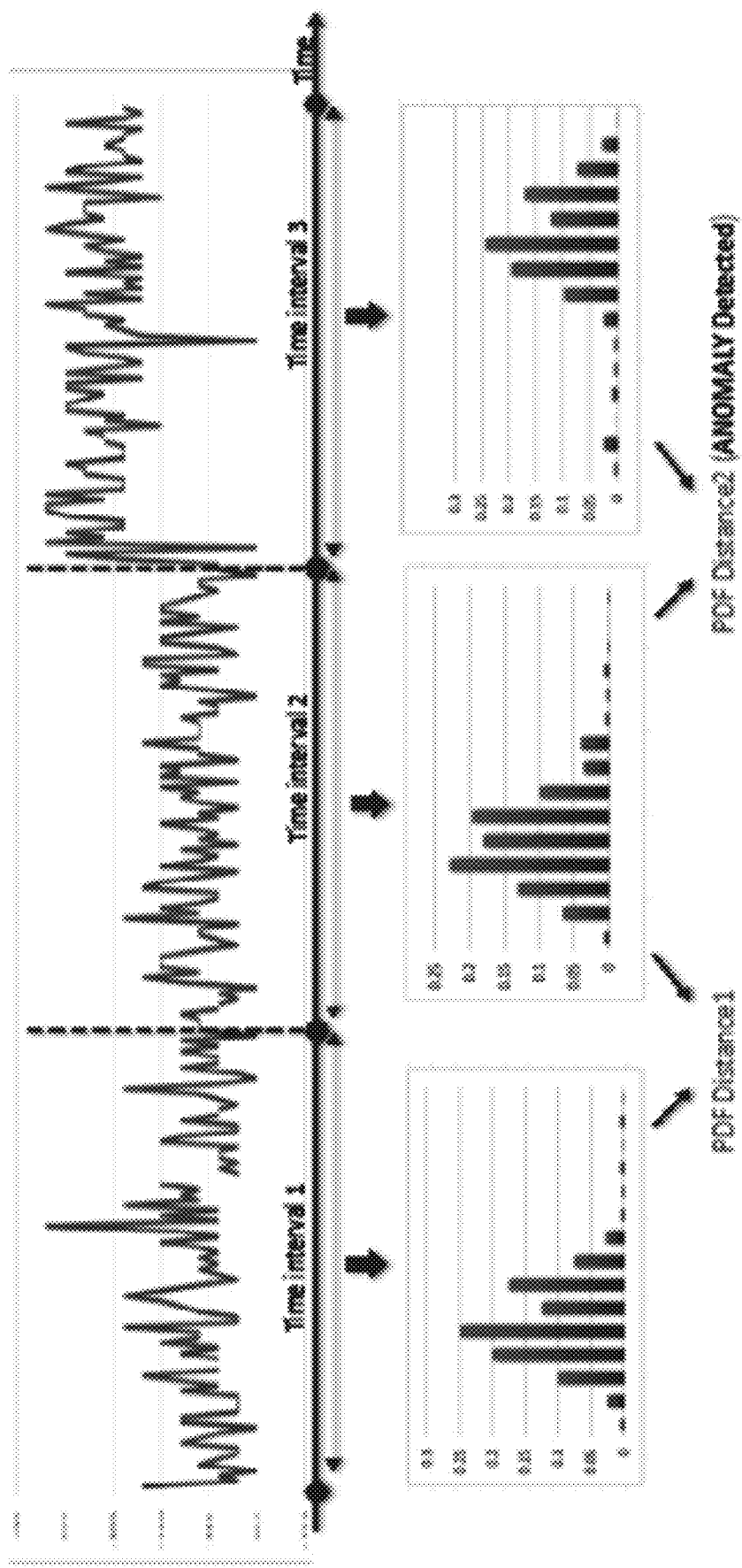
FIG. 9 illustrates an embodiment of comparing PDF distance to detect an anomalous node.

FIG. 9 illustrates an example of detecting an anomaly at a network node using PDF distance. FIG. 9 shows measurements from a cell in a wireless network over three successive measurement intervals and the corresponding PDFs. The changes between measurements for time interval 1 and time interval 2 are minimal and represent normal behavior at the node. On the other hand, the changes in the measurements from the second to the third interval are more substantial, so the PDF distance value for intervals 2 and 3 is much greater than the PDF distance value for intervals 1 and 2, and exceeds the magnitude of the predetermined value for PDF distance for the selected node. Accordingly, an embodiment determines time interval 3 is associated with anomalous behavior at the node.

Figure 10A:
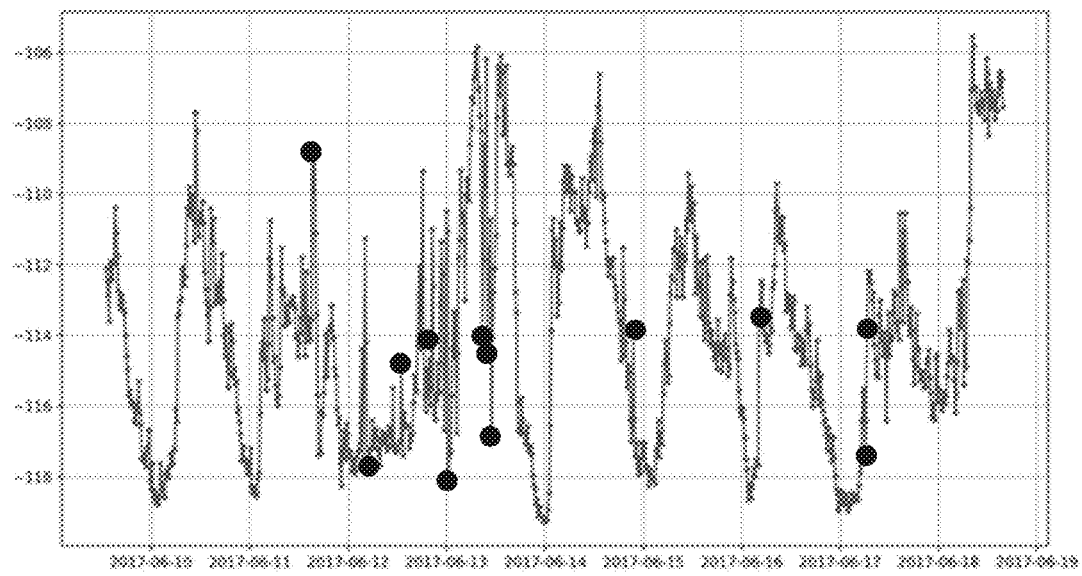
FIG. 10A illustrates a graph of average PDF values.
Figure 10B:
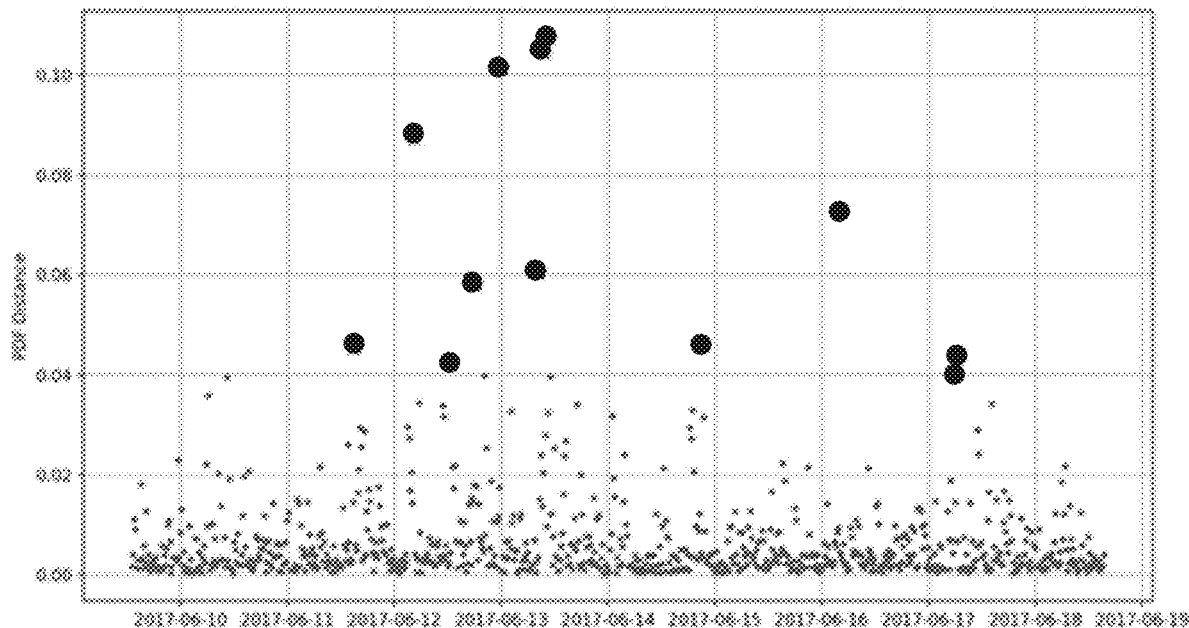
FIG. 10B illustrates a graph of PDF distance values for the same PM data.
Figure 11:
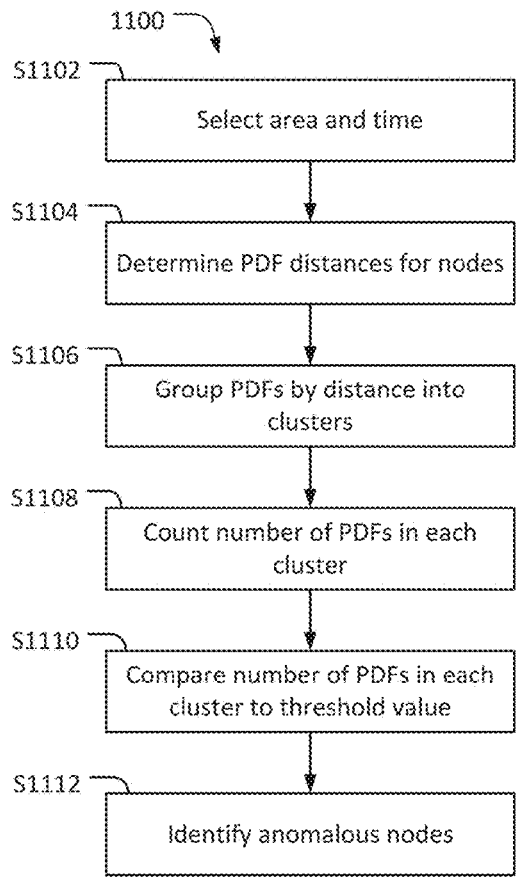
FIG. 11 illustrates an embodiment of a process for comparing PDF distances.

Another example of using PDF distance to detect anomalies at nodes is illustrated by FIGS. 10A and 10B, which were created using data from an active cellular network. Each of those figures illustrates characteristics of the same network node over an 8-day time period. In FIG. 10A, each point on the plot represents an average value of measurements from an observation window of 15 minutes. For the same set of measurements, FIG. 10B shows the PDF distance, which was calculated as the Hellinger Distance, between measurements from successive intervals. Anomalies detected by PDF distance are indicated by the large dark circles in FIGS. 10A and 10B.

While the variations in consecutive PDFs are not apparent in the graph of average values of FIG. 10A, they are readily apparent from the PDF distance values as illustrated in FIG. 10B. In some embodiments, a single large distance variation may indicate an anomaly at a cell. In other embodiments, an anomaly is only determined to be present when a predetermined number of consecutive PDF distances exceed a threshold value, or when a predetermined number of consecutive PDF distances within a predetermined time period exceed a threshold value. Persons of skill in the art will recognize that embodiments may be tuned to detect various anomalies under a variety of conditions by adjusting the number and magnitude of PDF distance variations required to indicate an anomalous cell.

The inventors have observed that PDFs of network nodes in similar geographic regions and similar times tend to have similar shapes and positions under normal conditions. Therefore, in an embodiment, anomalous nodes are identified by comparing PDF shapes and positions at S608. Examples of comparing PDF shapes and positions will be explained in more detail with respect to a process 1100 for comparing PDF shapes and positions of nodes in a network. In this technique, PDFs are collected over analysis time-periods from the network. Here, the term "shape" refers to the shape of a PDF, e.g. skewness, kurtosis and modality, and the position refers to the location of the PDF on the X-axis of a Euclidian graph.

Network nodes within a geographic area are selected at S1102. The area may be an entire network area, an area of interest such as an area in which anomalies are expected to be present, etc. In addition, one or more time interval of interest may be selected at S1102. Times may be high traffic time periods, or times in which an anomaly is probable. In an embodiment, the area and times are all times and areas within a network. Embodiments may analyze an entire network on an ongoing basis for anomalous nodes.

PDF distances are determined at S1104 for nodes with the area selected at S1102. Techniques for determining PDF distances are described above with respect to S606. However, at S1104, distances are determined between different nodes. This differs from S606, which compared distances between PDFs for consecutive measurement intervals at the same node.

In some embodiments, PDF distances are only determined for a limited set of neighbors of each node. In particular, PDF distances for a given node may be determined for all other nodes that are within a predetermined distance from the given node, e.g. one kilometer. In other embodiments, the PDF distance determinations may be limited to nodes that have a neighbor relationship with the given node, e.g. first or second tier neighbors. An embodiment may select a first group of nodes, calculate the distances from those nodes to all other nodes and clusters in a set of nodes in a first phase of evaluation, select a second group of nodes different from the first group in a second phase of evaluation, and continue iterations until all nodes are evaluated. Other embodiments are possible.

PDFs, or nodes associated with PDFs, may be grouped into clusters for each time interval according to the distances determined at S1104 at S1106. In an embodiment, the nodes are grouped using a nearest-neighbor algorithm. Nearest-neighbor algorithms are used to identify anomalous nodes based on the assumption that regular points are close together while anomalous points are far from other points. Here, the points may refer to vectors in a potentially multi-dimensional space.

There are two primary classes of nearest-neighbor algorithms. The first identifies points that are far away from other points with respect to a distance-metric to be anomalous, while the second identifies points that are in sparse regions to be anomalous. An example of the first class of techniques is the K-Nearest Neighbor (KNN) technique that measures the distance of the K-nearest neighbor for every point and flags points with large KNN distances to be anomalous. When a KNN technique is employed, the binned PM data for a first node is compared to binned PM data of other nodes and distance values are calculated for the distance between the first node and each of the neighbors. The distance values are then compared to a threshold value, and if the Kth lowest distance value exceeds the threshold value, then the first node is determined to be anomalous. In such a technique, if performance of a single node is sufficiently different from the performance of other nodes in the network, it is identified as anomalous.

An example of the second class of techniques is the Local Outlier Factor (LOF) technique. Both types of techniques use a distance metric such as a Euclidean distance to determine the distance to the nearest points. In an embodiment of the present disclosure, since the multi-dimension points are PDFs, the PDF-distance measure is employed as the distance metric.

Clustering based algorithms are based on the discovery that normal points belong to large and dense clusters, while anomalies do not belong to any of the clusters or form very small clusters. Example of clustering algorithms that can be used in various embodiments are DBSCAN and hierarchical agglomerative clustering (HAC). As in the nearest neighbor techniques, a distance metric is a component of the algorithms. Here, since the multi-dimension vectors are actually PDFs, the PDF-distance measures described above are used to cluster PDFs.

After PDFs have been clustered, the number of PDFs that are within each cluster may be identified at S1108. In an embodiment, the number of PDFs in each cluster is compared to a threshold value at S1110, and if the number of PDFs in a cluster is less than the predetermined value, nodes associated with the PDFs in the cluster are identified as anomalous nodes at S1112. In some embodiments the threshold value is one, so that all PDFs that cannot be grouped into clusters are identified as being associated with anomalous nodes. The threshold value may be established after training at S306. In an embodiment, the threshold value is a percentage of the total number of nodes.

In some embodiments, additional analysis is performed to identify anomalous nodes at S1112. For example, certain PDF shapes and positions may be associated with known anomalies, so that when a PDF is identified with a shape and/or position that corresponds to a known shape and/or position, the PDF is identified as being associated with an anomalous node.

Figure 12:
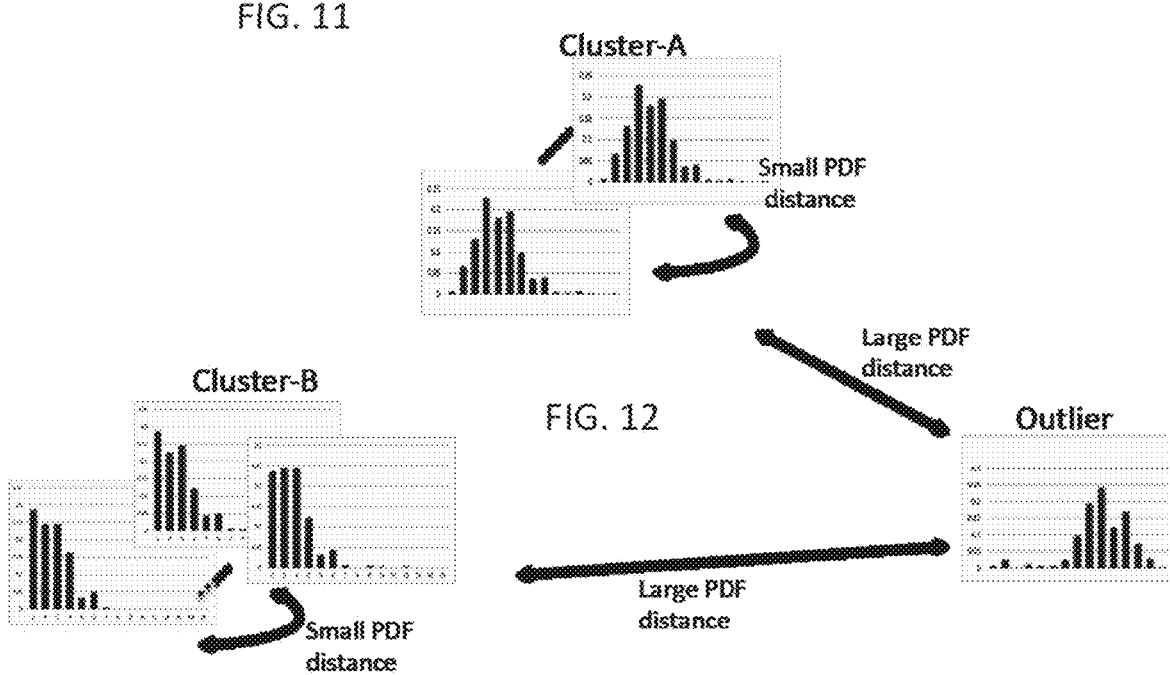
FIG. 12 illustrates an embodiment of comparing PDF distances.

FIG. 12 shows an example of grouping PDFs into clusters by distance and identifying anomalous nodes. As seen in FIG. 12, PDFs have been grouped into two clusters— Cluster-A and Cluster-B—that include PDFs with relatively small distances between shapes and similar positions. The shape of the PDF of the Outlier cell has a relatively large distance from other PDFs and the position is different from the PDFs in cluster A, so it is identified as being associated with an anomalous node at S1112.

Figure 13:
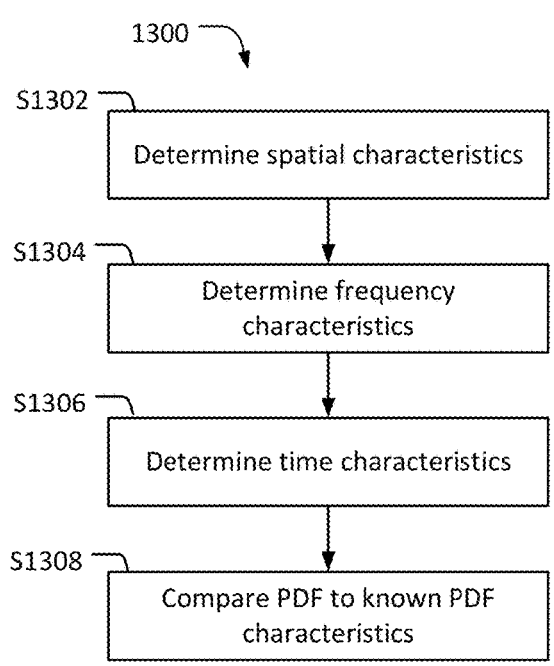
FIG. 13 illustrates an embodiment of a process for determining a cause of an anomaly.

Returning to process 300, after anomalous nodes are determined at S308, a cause of the anomaly may be determined at S310. FIG. 13 illustrates a process 1300 of determining a cause of an anomaly that has been detected at one or more network node.

Spatial characteristics of an anomaly can be useful for determining the cause of an anomaly. For example, when interference is present in a limited geographical area, it will only affect nodes in that geographic area. Similarly, a malfunctioning base station may affect all cells that are served by that base station, and a malfunctioning antennal may affect all cells that are associated with that antenna, but not other cells. Accordingly, spatial characteristics of anomalies may be determined at S1302.

In an embodiment, determining the spatial characteristics of anomalies includes determining spatial characteristics of nodes associated with PDFs that have been identified as anomalous for a given time interval. The spatial characteristics may include spatial characteristics of network equipment. For example, when a node is a cell, the spatial characteristics may include a location of an antenna providing service to the cell. Similarly, when the anomalous node is an antenna, a spatial characteristic of the antenna may be the location of the base station to which the base station is attached.

Frequency characteristics of anomalous nodes may be determined at S1304. Knowing that an anomaly is specific to a limited set of frequencies can be helpful in determining the cause of an anomaly. For example, when nodes within a limited geographic region identified at S1302 also use the same set of frequencies, there is a high probability that a local interference source is present that is transmitting on that set of frequencies.

The process may determine time characteristics of one or more anomalous nodes at S1306. Some causes of anomalies can be identified by time characteristics of the anomaly. For example, certain industrial operations are known to cause RF interference. When anomalies are detected for nodes near an industrial plant that coincide to operating hours of the industrial plant, a system can use that information to determine that interference from the industrial plant is a likely cause of the anomaly. Similarly, the timing of an anomaly may be associated with the timing of an event such as a traffic jam or a community event. Therefore, time characteristics of the anomaly can be useful in determining the cause of the anomaly.

Another process that can be performed to determine a cause of an anomaly is to analyze the characteristics of the PDF itself by comparing the characteristics of the anomalous PDFs to characteristics of known causes of anomalies at 3108. For example, large minimum bin values are an indication that a constant power interferer is present, while large maximum bin values may indicate the presence of a high-power interferer. Accordingly, the shape and/or position of a PDF can be used to determine the cause of an anomaly.

When the cause of an anomaly has been identified and the cause is a problem in the network, the anomaly may be resolved at S312. For example, when an anomaly is determined to be caused by a malfunctioning base station, an operator may send a technician to the base station to fix the problem. When the problem is determined to be interference, an operator may perform actions to eliminate the interference.

A number of interference characteristics of a source of interference can be determined from embodiments of this disclosure, such as magnitude and frequency. Magnitude of a source of interference can be estimated by the number and extent to which interference is correlated at neighbor cells, while frequency characteristics can be determined by analyzing which frequencies are affected. This information may then be correlated with a list of known, pre-characterized interference sources to aid network operators in the detection of the interference source. This data, which may include raw data, reports, etc., may be used by network operator personnel to identify and eliminate sources of interference that are negatively affecting network performance.

Embodiments of the present disclosure can be used to identify the location of a source of interference. The localization process may include triangulation or trilateration based on location, as well as antenna pointing angles and the detected noise amplitudes of each affected cell.

Figure 14:
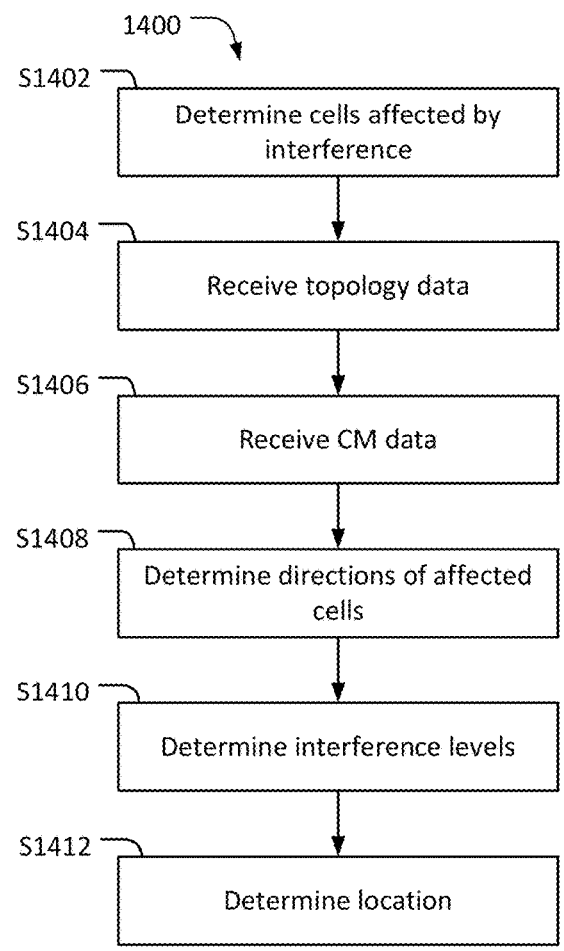
FIG. 14 illustrates an embodiment of a process for localizing a source of interference.

FIG. 14 shows an embodiment of a process 1400 for localizing an interference source. A plurality of cells that are affected by interference are determined at S1402 by performing process 300 as described above.

Network topology data is received at S1404. The network topology data may include geographical coordinates of the cells that are affected by interference, which may be expressed as latitude and longitude coordinates for each cell. Additional topology data may include elevation data for the cells, and data related to the surrounding network environment that could affect RF propagation, such as locations of commercial structures, bodies of water, etc.

Configuration Management (CM) data is received at S1406. The CM data may include, for example, frequencies used by the cells, pointing directions, azimuth, elevation, half-power beamwidth, transmission power, etc. The CM data may be received in response to a request specifically transmitted for process 1400 or may be stored by a spectrum analysis server 140 for use in multiple processes.

Figure 15:
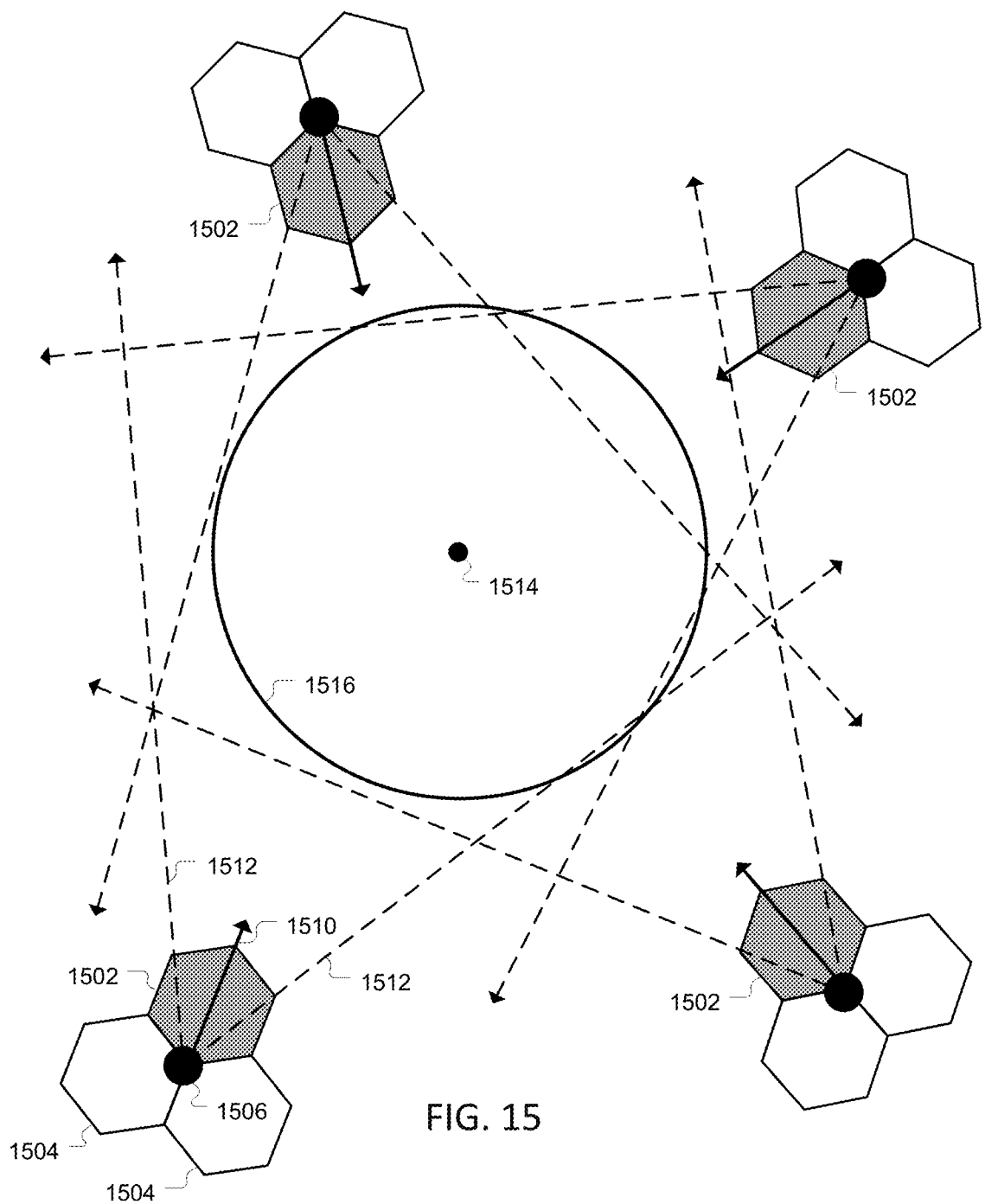
FIG. 15 illustrates an embodiment of localizing a source of interference.

FIG. 15 shows a plurality of cells 1502 that are affected by interference. One of the cells 1502 may be a target cell, while the other cells are neighbor cells that are correlated with the target cell. Co-site cells 1504 of a cell site 1506 are shown in FIG. 15 as well, but for the purposes of this example they are not affected by interference.

The direction 1510 of cells 1502 that are affected by interference are determined at S1408. While FIG. 15 shows direction 1510 as being the pointing direction of antennas, or azimuth, embodiments may determine additional direction information at S1408. For example, half-power beamwidth may be determined in order to establish antenna transmission areas 1512, which may vary between cells according to transmission power.

Interference amplitude of affected cells is determined at S1410. In an embodiment, interference levels may be extracted from network event recordings. The magnitude of interference can be used as a proxy for distance from the cells to localize an interference source.

The location of a source of interference is determined at S1414. In an embodiment, a location is a point 1514 that is determined to have the highest probability of being the source of the interference based on analyzing the cell data in process 1400. However, the location data may be presented in many different ways.

For example, in one embodiment, the location data is an area 1516. The area 1516 may be determined from a statistical process, such as a probability value, where data analysis suggests that there is, for example, a 90% probability that a source of interference is within the area. In other embodiments, the location data may be expressed as an asymmetric heat map, a plurality of concentric circles or other shapes representing a distribution of probabilities, etc.

The accuracy of interference localization depends on the number of and location of correlated high noise rise neighbor cells, as well as the amount of available data for the cells, such as pointing direction and half-power beamwidth. Persons of skill in the art will recognize that a number of different approaches can be taken to calculate location using cell data, such as triangulation, trilateration, etc. Examples of some of the techniques that could be employed can be found, for example, in U.S. application Ser. No. 14/827,226.

When one or more target cell is classified as being affected by regional interference, personnel can use the localization information, such as a localization map or geographic coordinates, to identify a specific area as having the highest probability of being the location of the source of interference. Process 1400 may further characterize the interference with, for example, time and frequency information, that can help a network operator rapidly and efficiently identify its source. For example, time, amplitude and frequency characteristics can be used to determine that interference is from a predetermined source, such as a sparking electrical coupling or a radar installation.

Embodiments of the present disclosure represent a number of improvements to existing wireless communication technology. Conventional approaches to analysis of PM data are not capable of detecting a variety of anomalies in a wireless network such as short-term anomalies. A typical conventional approach uses a single PM value for each measurement interval, which is typically an average of all PM measurements for a node across the interval. By averaging PM data in this way, anomalies are obscured when large sets of PM data are averaged. Accordingly, the present disclosure represents an advancement in the art of wireless communications.

Embodiments of the present disclosure are especially well suited to identifying, characterizing and localizing interference. Data suggests that from 5% to 10% of existing cells are under-performing as a result of unintentional non-cellular interference. The sources of such interference vary greatly, and include poorly insulated transformers, corroded connections, and unregulated transmitters.

An operator can use information from embodiments of this disclosure to deploy personnel to remedy the physical cause of interference, such as replacing an oxidized connector or notifying a power company of a malfunctioning component. An operator may be a licensor of RF spectrum that operates a cellular telecommunications network. Furthermore, embodiments of the present disclosure can analyze and characterize interference without requiring network service interruptions, and without installing additional energy sensing equipment in network areas.

In addition to interference identification, characterization and elimination, embodiments of this disclosure are applicable to the emerging field of spectrum sharing. In shared spectrum systems, multiple network operators, each maintaining their network, communications and sensing devices cooperatively, share specific blocks of radio frequency spectrum. In such a system it is beneficial to rapidly detect interference conflicts between various operators such that spectrum sharing policies can be updated in real-time to resolve such conflicts. Embodiments of this disclosure support spectrum sharing by providing network operations teams with analytical tools such that they can identify anomalies caused by other users transmitting in the associated spectrum bands.

What is claimed is:

1. An automatic method for a wireless telecommunications network, the method comprising:
   receiving performance measurement (PM) data for a plurality of nodes in the wireless telecommunications network, wherein the PM data is based on measurements taken by base stations of the wireless telecommunications network;
   accessing sets of binned data of the PM data for each node of the plurality of nodes;
   comparing at least one characteristic of the binned data for each node to at least one of a threshold value and the binned data for another node of the plurality of nodes;
   determining whether an anomaly is present at each of the plurality of nodes based on a result of the comparison; and
   rendering an output indicating whether the anomaly is present on a display,
   wherein comparing the at least one characteristic comprises comparing a spread of each set of binned data to the threshold value, and
   wherein an anomaly is determined to be present at a respective node associated with each set of binned data that exceeds the threshold value.

2. The method of claim 1, wherein the PM data is received from a Radio Access Network (RAN) as at least one histogram or discrete measurements, the method further comprising:
   converting the at least one histogram or the discrete measurements into at least one probability density function (PDF), wherein the binned data that is compared are PDFs.

3. The method of claim 1, wherein comparing the at least one characteristic further comprises comparing a distance between a first set of binned data for each node and a second set of binned data for each node to a predetermined value, and
   wherein the first set of binned data and the second set of binned data are for consecutive measurement intervals.

4. The method of claim 1, wherein comparing the at least one characteristic further comprises:
   determining distances between each set of binned data of the plurality of nodes and remaining sets of binned data of the plurality of nodes; and
   grouping the sets of binned data into clusters based on the distances.

5. The method of claim 4, wherein determining whether an anomaly is present comprises:
   comparing a number of sets of binned data in each cluster to a second threshold value, wherein anomalies are determined to be present at each cluster for which the number of sets of binned data is less than the second threshold value.

6. The method of claim 1, wherein comparing the at least one characteristic further comprises:
   comparing a distance between consecutive sets of binned data of each node to a second threshold value; and
   comparing shapes and positions of sets of binned data for a same time interval to each other.

7. The method of claim 1, further comprising:
   measuring physical properties of the plurality of network nodes to create the PM data.

8. The method of claim 1, further comprising:
   after determining that the anomaly is present at a node of the plurality of nodes, identifying a cause of the anomaly by analyzing characteristics of the node; and
   resolving the cause of the anomaly.

9. The method of claim 1, wherein comparing the at least one characteristic further comprises:
   determining distance values between a first node of the plurality of nodes and other nodes of the plurality of nodes;
   comparing the distance values to a predetermined threshold value; and
   when all of the distance values exceed the predetermined threshold value, identifying the first node as an anomalous node.

10. A wireless telecommunications system comprising a spectrum analysis server coupled to a performance monitoring system, the spectrum analysis server comprising a processor and a non-transitory computer readable medium with instructions stored thereon which, when executed by the processor, perform the following steps:
    receiving performance measurement (PM) data for a plurality of nodes in the wireless telecommunications network, wherein the PM data is based on measurements taken by base stations of the wireless telecommunications network;
    accessing sets of binned data of the PM data for each node of the plurality of nodes;
    comparing at least one characteristic of the binned data for each node to at least one of a threshold value and the binned data for another node of the plurality of nodes;
    determining whether an anomaly is present at each of the plurality of nodes based on a result of the comparison; and
    rendering an output indicating whether the anomaly is present on a display,
    wherein comparing the at least one characteristic comprises comparing a spread of each set of binned data to the threshold value, and
    wherein an anomaly is determined to be present at a respective node associated with each set of binned data that exceeds the threshold value.

11. The system of claim 10, wherein the PM data is received from a Radio Access Network (RAN) as at least one histogram or discrete measurements, and the steps further comprise:
    converting the at least one histogram or the discrete measurements into at least one probability density function (PDF), wherein the binned data that is compared are PDFs.

12. The system of claim 10, wherein comparing the at least one characteristic further comprises comparing a distance between a first set of binned data for each node and a second set of binned data for each node to a predetermined value, and
    wherein the first set of binned data and the second set of binned data are for consecutive measurement intervals.

13. The system of claim 10, wherein comparing the at least one characteristic further comprises determining distances between each set of binned data of the plurality of nodes and every remaining sets of binned data of the plurality of nodes; and
    grouping the sets of binned data into clusters based on the distances, and
    wherein determining whether an anomaly is present comprises comparing a number of sets of binned data in each cluster to a second threshold value, wherein anomalies are determined to be present at each cluster for which the number of sets of binned data is less than the second threshold value.

14. The system of claim 10, wherein comparing the at least one characteristic further comprises:
comparing a distance between consecutive sets of binned data of each node to a second threshold value; and
comparing shapes and positions of sets of binned data for a same time interval to each other.

15. The system of claim 11, wherein the RAN measures physical properties of the plurality of network nodes to create the PM data.

16. The system of claim 10, further comprising:
after determining that the anomaly is present at a node of the plurality of nodes, identifying a cause of the anomaly by analyzing characteristics of the node.

17. The system of claim 10, wherein comparing the at least one characteristic further comprises:
determining distance values between a first node of the plurality of nodes and other nodes of the plurality of nodes;
comparing the distance values to a predetermined threshold value; and
when all of the distance values exceed the predetermined threshold value, identifying the first node as an anomalous node.

18. An automatic method for a wireless telecommunications network, the method comprising:
receiving performance measurement (PM) data for a plurality of nodes in the wireless telecommunications network, wherein the PM data is based on measurements taken by base stations of the wireless telecommunications network;
accessing sets of binned data of the PM data for each node of the plurality of nodes;
comparing at least one characteristic of the binned data for each node to at least one of a threshold value and the binned data for another node of the plurality of nodes; and
determining whether an anomaly is present at each of the plurality of nodes based on a result of the comparison,
wherein comparing the at least one characteristic comprises:
comparing a spread of each set of binned data to a first threshold value;
comparing a distance between consecutive sets of binned data of each node to a second threshold value;
comparing shapes and positions of sets of binned data for a same time interval to each other; and
rendering an output indicating whether the anomaly is present on a display.

* * * * *